UNITED STATES PATENT OFFICE.

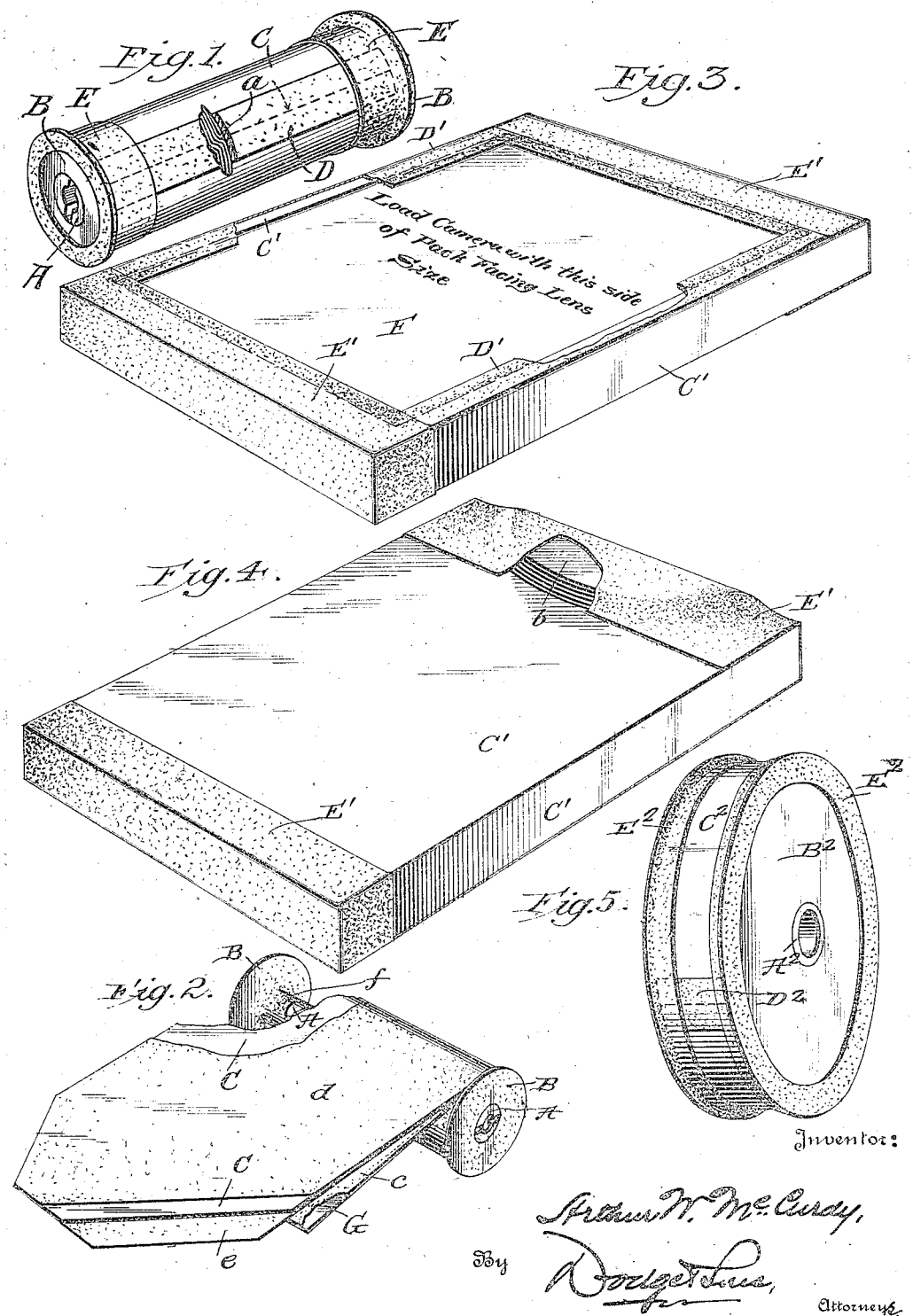

ARTHUR W. McCURDY, OF VICTORIA, BRITISH COLUMBIA, CANADA.

PHOTOGRAPHIC-FILM CARTRIDGE OR PACK.

1,261,748.  Specification of Letters Patent.  Patented Apr. 2, 1918.

Application filed January 18, 1918. Serial No. 212,489.

*To all whom it may concern:*

Be it known that I, ARTHUR W. McCURDY, a subject of the King of Great Britain, residing at Victoria, British Columbia, Canada, have invented certain new and useful Improvements in Photographic-Film Cartridges or Packs, of which the following is a specification.

This invention relates to photographic film cartridges, moving picture films, and film packs, and has for its object the hermetic sealing thereof, whereby the films may be kept unimpaired for an indefinite period, and under varying meteorological conditions.

It is well known that sensitized films and plates deteriorate somewhat rapidly when subject to any considerable degree of humidity, to high temperatures, and to certain other atmospheric conditions. The presence of moisture within a photographic film cartridge, film pack, or like film container, is highly injurious to the contained film, yet it has been found difficult under prior constructions completely to exclude moisture therefrom. Exposed and developed films are similarly affected, but in lesser degree.

Heretofore roll film cartridges have been wrapped in paraffined paper and metallic foil, for the purpose of excluding moisture. This, however, materially increases the expense, and does not hermetically seal the cartridge. Containing cases of metal, glass, and the like, provided with hermetically sealing closures, have been employed by travelers and explorers to protect photographic plates, films, and cartrides from the effects of the atmosphere, but these are at once expensive, bulky, and heavy.

I aim by my invention to produce a self-contained cartridge, pack, or other multi-exposure film package, which without a separate container shall be hermetically sealed, waterproof, and capable of withstanding for long periods even immersion in water, thereby greatly prolonging the period within which the film may be satisfactorily exposed and developed, and guarding the same against injury by mishaps before or after exposure, which under present conditions would utterly destroy their usefulness.

In carrying out my invention I can attain the stated ends by first hermetically sealing all openings through which moisture might possibly enter within the photographic cartridge, pack, of package, and thereafter immersing the whole in a bath of waterproofing material, or otherwise completely coating its exterior with such material.

If, as I contemplate in some cases, the wrapper or envelop which incloses the film, whether in roll form or other, be waterproofed prior to application to the film, or in other words, prior to making up the cartridge or pack, it may be sufficient merely to seal hermetically the joints or openings of the cartridges or pack.

In the accompanying drawings:

Figure 1 is a perspective view showing my invention applied to the well-known photographic roll film cartridge, this being the most generally used form of multi-exposure film package;

Fig. 2 is a perspective view of a partially unwound cartridge film, with portions broken away to show the waterproofed spool and the waterproofed light-excluding wrapper interwound with the photographic film about said spool;

Figs. 3 and 4 are perspective views of a film pack showing respectively the front and rear faces thereof;

Fig. 5 is a perspective view of a moving picture film cartridge embodying my invention.

Fig. 1 represents the cartridge in perspective, A indicating the end of the spool or wooden cylinder about which the cartridge is wound; B, B the disks at the ends of the spool, employed to guide the film and envelop in winding, and to exclude light along their longitudinal edges; and C, the outer wrapper or envelop which is employed to exclude light from the contained or interwrapped sensitized film.

The cartridge may be either of the autographic or non-autographic type, the specific construction of the interior of the cartridge being optional, and not material to the present invention.

Under the construction now generally adopted, the end of the outer wrapper or envelop is V-pointed, and held down upon the body of the cartridge by a sticker or paster, which is carried around the cartridge either completely or partially. Under my construction, this pointed end is folded back within the wrapper along the line *a*, and instead of a paster or sticker covering the meeting line of the free end and the body of the wrapper or envelop for a portion only of its length, I employ a waterproof strip or band D of or coated with adhesive material, which extends from end to end of the fold or joint, and hermetically seals the opening between the free end and body portion of the wrapper or envelop. This band or strip may if desired pass entirely about the cartridge, or it may, as shown, merely extend a comparatively short distance to both sides of the line a. At each end of the cartridge I apply a strip or band E of like adhesive waterproof material, pressing the same down into firm and close contact with the outer and inner faces of the disks, and causing the inner edges of the strips to overlap and adhere to the sealing strip or band D and to the wrapper or envelop, if the same be not completely encircled by said sealing strip or band D.

As the disks B are somewhat lightly pressed to place upon the shouldered ends of the spool A, there is a possibility of moisture entering at these points. Effectively to guard against this, I coat the entire exposed or outer surface of the cartridge, pack, or package with a waterproofing agent in the form of a liquid or solution, either by brief immersion therein, or by applying the same by brush, spray, or otherwise. Cellulose acetate, cellulose nitrate, or like cellulose derivative I find admirably suited to this purpose, these being capable of being made as thick or thin as desired, and being also thoroughly waterproof.

The foregoing description contemplates the protection of cartridges already made up. Where, however, such protection is to be included as a part of the original manufacture of the cartridge, pack, or package, it will be found advantageous first to immerse the spool in the waterproofing solution, or otherwise to coat the same prior to winding the film and envelop thereon.

In another application, Serial No. 173,818, filed June 9, 1917, I have described a cartridge having the rear surface of the film (indicated in Fig. 2 by G) and both the inner and outer surfaces of the wrapper C rendered waterproof. This is also illustrated in Fig. 2, where c, d, and e indicate waterproof coatings, and in its most perfect form the cartridge, pack, or package here proposed will embody such initial or preliminary waterproofing. In such case and with the spool (in the case of a roll film cartridge), previously waterproofed, likewise indicated in Fig. 2 by f, the immersion or coating of the cartridge after completion will not, for general use, be essential, though it will afford a greater security against entrance of moisture. When intended for use by explorers and others the loss of whose films would in most cases be irreparable, I deem such final coating important. A considerable measure of protection will, however, be afforded by merely hermetically sealing the light-excluding wrapper or envelop along the folding line a, along the points of contact with the disks B, and at the junction of the disks and the wooden cylinder or spool.

Referring now to Figs. 3 and 4, it will be seen that in its essential features the mode of waterproofing the film pack is the same as in the case of the cartridge; that is to say, the openings of the light-excluding wrapper or envelop C' are first sealed by strips of adhesive, waterproof tissue or fabric. Thus strips D', D' are applied to and made to overlap the longitudinal boundaries of the opening on the lens side of the pack, the strips being caused to adhere to the body of the envelop and to the light-excluding sheet F, which as the pack is furnished to the trade, closes such opening. Other strips E' similarly cover and seal the transverse edges or the ends of the opening of the front or lens side of the pack, and the entire ends, front and rear, of the pack. At the tab end of the pack where the tabs b of the individual film-moving strips or envelops are folded down upon the exterior of the pack, the strip E' is carried over and somewhat beyond said tabs, and cemented to the back of the light-excluding wrapper C'. After being thus sealed, and to guard against any possible opening remaining, the entire pack is immersed in or otherwise coated with a film of cellulose nitrate or other waterproof cellulose derivative.

The cartridge or the film pack prepared as above described, does not require the usual outer wrapper of colored paper and metallic foil, nor the paper or cardboard envelop, though either or both of these may be retained if desired. The outer container will ordinarily be retained for conveniently receiving the film designation and the usual advertising matter, but so far as light-exclusion and protection against dampness and other atmospheric conditions is concerned, the pack is complete and ready for sale and use without either the colored paper and foil wrapper or the outer container.

The mode of waterproofing the moving picture film is or may be in all respects the same as in the case of the usual film cartridge. This is illustrated in Fig. 5, in which $A^2$ indicates one end of the spool; $B^2$ a head or disk of the spool; $C^2$ the light-excluding wrapper or envelop; $D^2$ a strip of adhesive waterproof tape, fabric, or tissue, covering the joint where the end of the light-excluding wrapper meets the main body of said wrapper; and $E^2$, $E^2$ similar sealing strips overlapping the edges of the spool heads or disks, and caused to adhere thereto and to the light-excluding envelop $C^2$ and sealing strip $D^2$.

A self-contained photographic film cartridge, film pack, or moving picture film prepared in accordance with this description will, without any other inclosure, withstand conditions which would speedily impair or totally destroy the ordinary cartridge, pack, or package. By this simple expedient the necessity of placing each separate cartridge, pack, or package in a metal or glass container and hermetically sealing such container, is obviated; the cost of protection is greatly reduced; and the space occupied is not increased over that required for the ordinary cartridge, pack, or package.

The film may after exposure and development be re-wound upon its spool or support with the waterproofed wrapper and envelop, and re-sealed hermetically by the adhesive strips or bands removed at the time of placing the cartridge, pack, or package in the camera, these being preserved for such subsequent use or re-application. This is particularly desirable for explorers, travelers, and commercial photographers, who are frequently away for long periods without facilities for properly protecting or caring for films under customary conditions of use.

The invention is obviously applicable to any multi-exposure flexible film cartridge, pack, or package, sealing strips being employed wherever there are well-defined openings through which the atmosphere or moisture might enter, the entire cartridge, pack, or package being, if desired, completely immersed in or coated with some waterproofing agent to preclude the entrance of moisture in the event that the envelop or wrapper be not already waterproof and non-absorbent.

In whatever form the multi-exposure film be put up as a complete charge or loading for the camera, it may, for brevity, be called a cartridge, though this term is more commonly applied to the roll cartridge of the character illustrated in Fig. 1. To avoid use of several terms, therefore, the word "cartridge" is used in the following claims in this broad or comprehensive sense, and is meant to include any prepared multi-exposure photographic film package of common or usual type.

Having thus described my invention, what I claim is:

1. A photographic film cartridge having its light-excluding wrapper or envelop hermetically sealed.

2. A photographic film cartridge having the joints between the free end and the body of the light-excluding wrapper and between the wrapper and the spool disks, sealed by waterproof strips caused to adhere to the parts to be connected.

3. A photographic film cartridge having the openings between the free end and the body of its light-excluding wrapper or envelop and between the envelop and the spool, sealed by adhesive tape or fabric applied thereto; and a film or coating of waterproof material completely enveloping all exposed surfaces of the complete cartridge.

4. A photographic film cartridge comprising a spool; a sensitized film; a waterproof light-excluding envelop or wrapper wound with the film about the spool; and adhesive fastenings connecting the free end of the wrapper with the body thereof and connecting the exposed body of the wrapper with the spool disks, whereby the cartridge is sealed against ingress of moisture.

5. A photographic film cartridge comprising a waterproof spool; a sensitized film; a light-excluding envelop or wrapper wound with the film about the spool; adhesive sealing fastenings connecting the free end of the wrapper with the body thereof and connecting the exposed body of the wrapper with the spool disks; and a coating of waterproofing material completely enveloping the exposed surfaces of the cartridge and the adhesive strips.

6. A roll film photographic cartridge comprising a waterproofed spool; a flexible photographic film; and a waterproof light-excluding wrapper interwound upon the spool and hermetically sealed.

7. A self-contained multi-exposure photographic film cartridge for use in a camera, including a hermetically sealed waterproof light-excluding envelop.

8. A roll film photographic cartridge, comprising a waterproofed spool; a sensitized flexible film; a waterproof light-excluding wrapper interwound with the film about the spool; and adhesive strips sealing the openings between the body and outer end of the wrapper and between the wrapper and the spool.

In testimony whereof I have signed my name to this specification.

ARTHUR W. McCURDY.